(12) United States Patent  
Asanuma

(10) Patent No.: US 8,295,776 B2  
(45) Date of Patent: Oct. 23, 2012

(54) RADIO COMMUNICATION APPARATUS AND RADIO COMMUNICATION METHOD

(75) Inventor: Yutaka Asanuma, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 250 days.

(21) Appl. No.: 12/726,532

(22) Filed: Mar. 18, 2010

(65) Prior Publication Data

US 2010/0311357 A1  Dec. 9, 2010

(30) Foreign Application Priority Data

Jun. 8, 2009  (JP) .................. 2009-137332

(51) Int. Cl.  
*H04B 17/00* (2006.01)  
*H04B 1/04* (2006.01)

(52) U.S. Cl. ................ 455/67.11; 455/103

(58) Field of Classification Search .......... 455/67.11, 455/67.13, 67.14, 69, 102, 103; 370/203, 370/208  
See application file for complete search history.

(56) References Cited

U.S. PATENT DOCUMENTS

2010/0285762 A1* 11/2010 Ko et al. ................ 455/127.1

OTHER PUBLICATIONS

3GPP TS 36.211; V8.6.0; Release 8; Mar. 2009; pp. 28-33.

* cited by examiner

*Primary Examiner* — Nguyen Vo  
(74) *Attorney, Agent, or Firm* — Maschoff Gilmore & Israelsen

(57) ABSTRACT

When SRS serving as a base of CSI measurement at a base station apparatus is transmitted from each of two antennas, a control unit controls resource element mappers to make the SRS orthogonal to each other or identical with each other in terms of frequency or code between the two antennas, in accordance with use of CSI at a base station apparatus.

14 Claims, 2 Drawing Sheets

RADIO COMMUNICATION APPARATUS AND RADIO COMMUNICATION METHOD

CROSS-REFERENCE TO RELATED APPLICATIONS

This application is based upon and claims the benefit of priority from prior Japanese Patent Application No. 2009-137332, filed Jun. 8, 2009, the entire contents of which are incorporated herein by reference.

BACKGROUND OF THE INVENTION

1. Field of the Invention

The present invention relates to a radio communication apparatus performing radio communications using a plurality of antennas.

2. Description of the Related Art

One of known cellular systems standardized in 3GPP ($3^{rd}$ Generation Partnership Project) is LTE (Long Term Evolution). In the LTE, SC-FDMA (Single-Carrier Frequency-Division Multiple Access) is adopted as a modulation format of an up link. In addition, in LTE-Advanced (E-UTRA Rel-10 and later), simultaneous communications using a plurality of antennas are often performed in accordance with the class of a mobile station (UE).

A base station (Node B) of LTE (including LTE-Advanced) receives SRS (Sounding Reference Signal) including known signals transmitted from the mobile station and evaluates a channel characteristic (Channel state) of the up link of the mobile station to obtain transmission path characteristic CSI (Channel State Information). See, for example, document 3GPP TS 36.211 V8.6.0 (2009-03) 5.5.3 Sounding reference signal.

The base station generates schedule information allocated by a resource block for the mobile station, on the basis of the obtained CSI, and selects Index of Pre-coding codebook which defines a transmission method of MIMO and MCS Index which defines modulation and coding, and transmits the information to the mobile station over a control channel (for example, PDCCH) of the down link. The mobile station selects the resource block, MCS, Pre-coding codebook on the basis of the information received over the control channel to perform communications over a channel (for example, PUSCH) of the up link.

Incidentally, the SRS is multiplexed at the same time (subframe) in the same frequency band (resource block) and then transmitted. More specifically, the SRS is subjected to stagger arrangement in a frequency direction so as to be orthogonalized with frequency or orthogonalized with code by using different sequences between mobile stations.

The stagger arrangement merely includes an even-number arrangement of arranging signals in even-numbered resource blocks and an odd-number arrangement of arranging signals in odd-numbered resource blocks. In addition, since the frequency band needs to be limited to a band in which frequency correlation can be maintained, in response to a transmission path variation in the frequency direction, an orthogonal sequence length of the SRS is limited. The SRS used in a wide band is implemented by connecting a plurality of short orthogonal sequences. In addition, increasing the number of orthogonal sequences by performing cyclic shift for the sequences is also executed.

In a system of performing simultaneous transmission using a plurality of antennas, however, transmitting signals by combining SRS orthogonal in frequency or code between the antennas is desirable for CSI measurement, but a problem arises that combinations of orthogonalization in frequency or code of the SRS are short as explained above.

When signals are transmitted by using a plurality of in a radio communication system of antennas performing evaluation of transmission path characteristics by transmitting the known signals, use of the known signals orthogonal in frequency or code between the antennas is desirable for the evaluation of the transmission path characteristics, but a problem arises that the combinations of orthogonalization in frequency or code are limited.

BRIEF SUMMARY OF THE INVENTION

The present invention has been accomplished to solve the above-described problems. The object of the present invention is to provide a radio communication apparatus and radio communication method capable of effectively executing evaluation of a transmission path characteristic by efficiently using a limited combination of making signals orthogonal to each other in frequency or code.

To achieve this object, an aspect of the present invention comprises a first antenna configured to execute radio transmission with a counterpart station, a second antenna configured to execute radio transmission with the counterpart station, a signal generating unit configured to generate a known signal which is known to the counterpart station, a use detecting unit configured to detect a use of an evaluation result of a transmission path characteristic executed by the counterpart station, and a transmission control unit configured to make the known signal subjected to the radio transmission via the first antenna and the known signal subjected to the radio transmission via the second antenna orthogonal to each other in terms of frequency or code, or identical with each other, in accordance with the use detected by the use detecting unit, and execute radio transmission.

According to the present invention, the known signal subjected to radio transmission via the first antenna and the known signal subjected to radio transmission via the second antenna are made orthogonal to each other in frequency or code, or made identical with each other, in accordance with the use of the evaluation result of the transmission path characteristic executed by the counterpart station by receiving the known signals.

Therefore, since orthogonality of the known signals transmitted via two antennas can be controlled in accordance with use of the evaluation result of the transmission path characteristic of a counterpart station, the present invention can provide a radio communication apparatus and radio communication method capable of effectively executing evaluation of a transmission path characteristic by efficiently using a limited combination of making the signals orthogonal to each other in frequency or code.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 1:
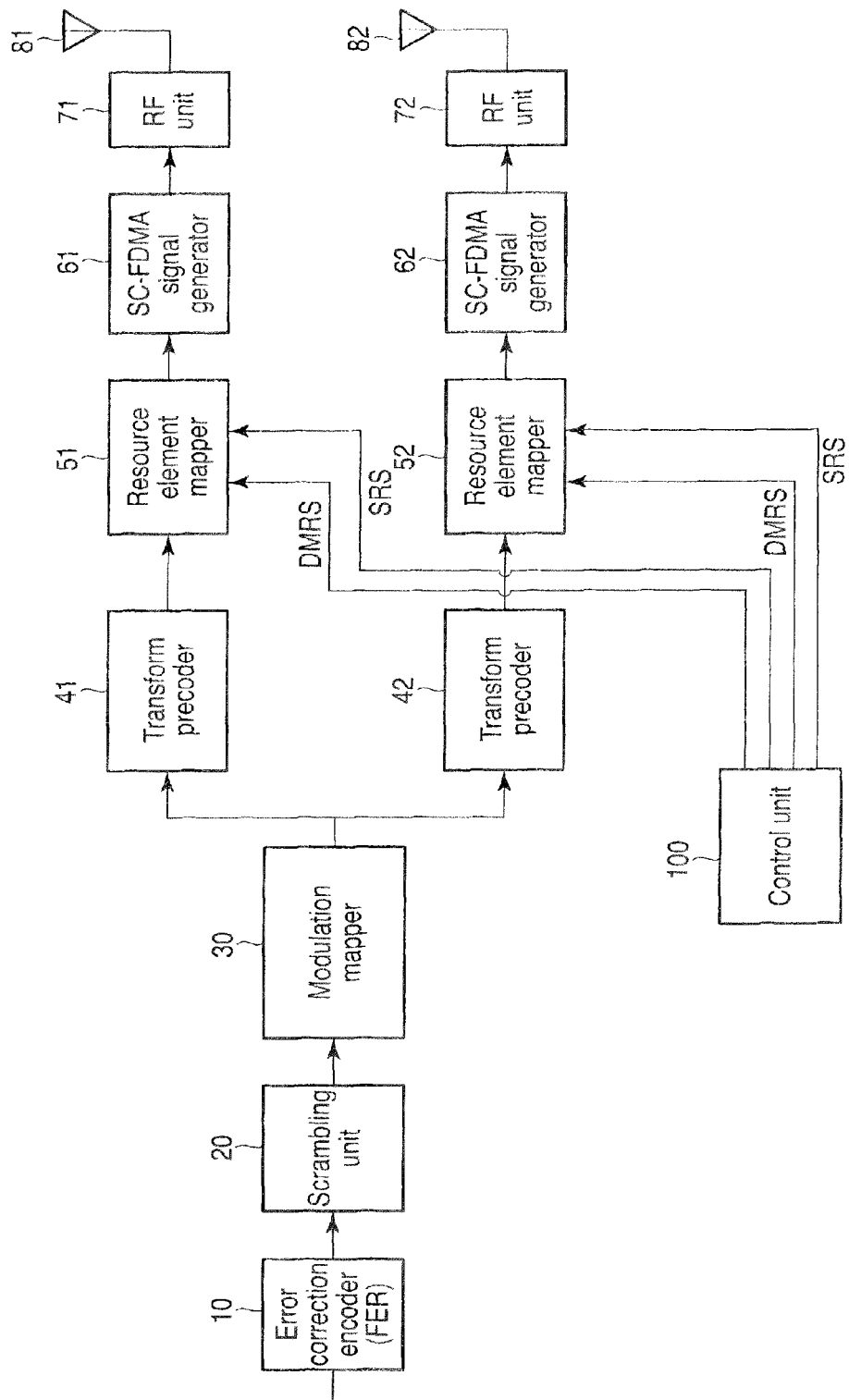
FIG. 1 is a block diagram showing a mobile radio terminal according to an embodiment of the present invention.

FIG. 1 shows a structure of a transmitting system of a mobile radio terminal according to the embodiment of the present invention. The mobile radio terminal comprises a receiver configured to receive a radio signal transmitted from a base station apparatus accommodated in a mobile communication network though not shown in FIG. 1.

The mobile radio terminal comprises an error correction encoder 10, a scrambling unit 20, a modulation mapper 30, transform precoders 41, 42, resource element mappers 51, 52, SC-FDMA signal generators 61, 62, RE units 71, 72, antennas 51, 52, and a control unit 100.

The error correction encoder 10 processes transmission data to be transmitted to the base station apparatus by error correction coding to obtain coded data.

The scrambling unit 20 scrambles the coded data.

The modulation mapper 30 modulates the scrambled coded data by QPSK, 16QAM, and the like.

The transform precoders 41, 42 execute waveform transform of the modulation of the modulation mapper 30. A time-frequency transform such as DFT (Discrete Fourier Transform) is applied as the waveform transform.

The resource element mapper 51 allocates the modulation result subjected to the waveform transform by the transform precoder 41, and SRS (Sounding Reference Signal) and DMRS (De-Modulation Reference Signal) supplied from the control unit 100 to a resource defined by frequency and time. Similarly, the resource element mapper 52 allocates the modulation result subjected to the waveform transform by the transform precoder 42, and the SRS and DMRS supplied from the control unit 100 to a resource defined by frequency and time. The SRS is a signal known at the base station apparatus.

The SC-FDMA signal generator 61 converts each of the signals allocated to the resource by the resource element mapper 51 into a time waveform signal, and generates an SC-FDMA signal. Similarly, the SC-FDMA signal generator 62 converts each of the signals allocated to the resource by the resource element mapper 52 into a time waveform signal, and generates an SC-FDMA signal.

The RF unit 71 converts the SC-FDMA signal generated by the SC-FDMA signal generator 61 into a radio frequency signal, amplifies the radio frequency signal, and emits the amplified radio frequency signal to space via an antenna 81. Similarly, the RF unit 72 converts the SC-FDMA signal generated by the SC-FDMA signal generator 62 into a radio frequency signal, amplifies the radio frequency signal, and emits the amplified radio frequency signal to space via an antenna 82.

The control unit 100 is configured to totally control each of the units related to the communications of the mobile radio terminal, and controls two transmission systems as described above and implements MIMO (Multi-Input Multi-Output) transmission to the base station apparatus. In particular, when transmission path characteristic CSI is measured at the base station apparatus, the control unit 100 controls generating the SRS in accordance with the use of CSI at the base station apparatus and urging the generated SRS to be transmitted.

The selection of the SRS is executed on the basis of directions of the base station apparatus. More specifically, the SRS is selected on the basis of a UE specific parameter transmitted from the base station apparatus. In accordance with the purpose of transmission of the SRS, the base station apparatus generates the UE specific parameter including information indicating the type of the SRS and transmits the generated UE specific parameter to the base station apparatus of interest. More specifically, when the measurement of the CSI for the allocation of the resource block and the measurement of the transmission timing are executed, the UE specific parameter is set as a value indicating the same SRS. In the other cases (for example, a case of executing the measurement of the CSI for setting Pre-coding of the MIMO transmission), the UE specific parameter is set as a value indicating the orthogonal SRS.

Figure 2:
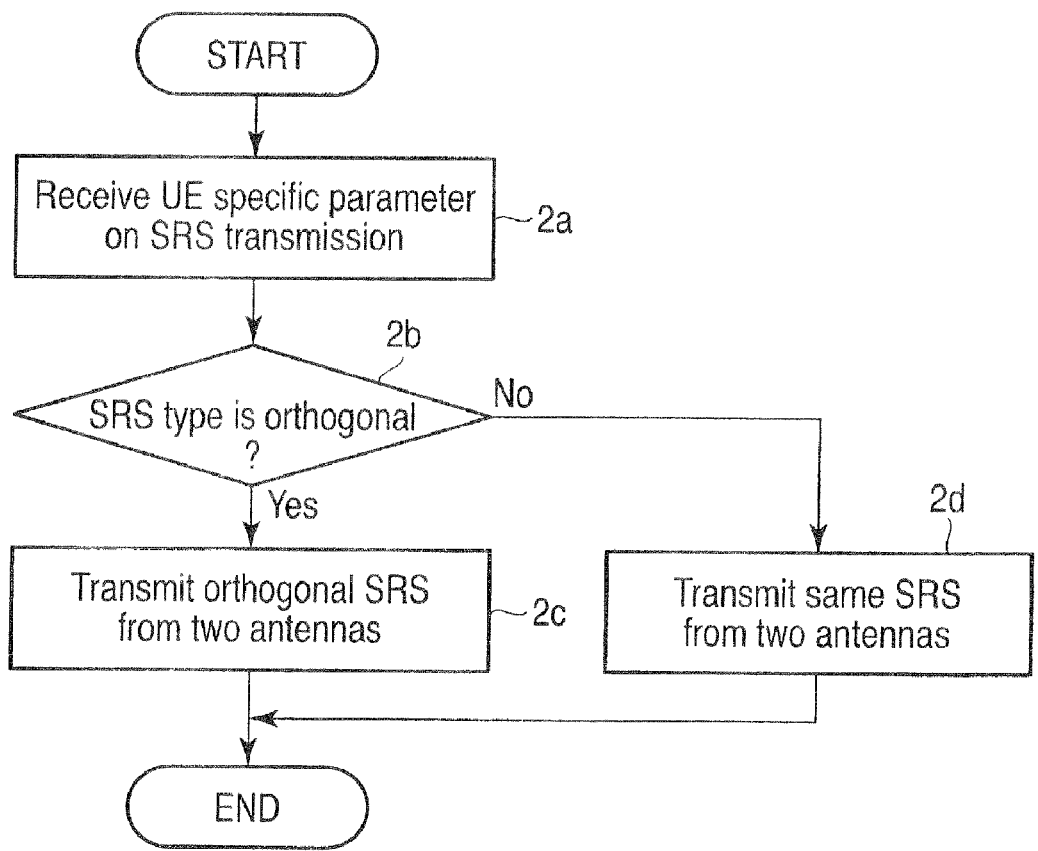
FIG. 2 is a flowchart explaining operations of the mobile radio terminal shown in FIG. 1.

Next, operations of the mobile radio terminal having the above-explained configuration will be described below with reference to FIG. 2. The following descriptions relate to the control of generating and transmitting the SRS in association with the present invention. The processing shown in FIG. 2 is executed by the control unit 100 when the SRS needs to be transmitted.

First, the control unit 100 receives the UE specific parameter to define the SRS transmission and detects the type of the SRS in step 2a, and then shifts to step 2b.

If the type of the SRS detected in step 2a is a value indicating "orthogonal" in step 2b, the control unit 100 shifts to step 2c. If it is a value indicating "identical", the control unit 100 shifts to step 2d.

In step 2c, the control unit 100 first generates two identical SRS, and controls the resource element mappers 51, 52 such that the SRS transmitted from the antenna 81 and the SRS transmitted from the antenna 82 are orthogonal to each other in terms of frequency and code. The orthogonalization of the two SRS can be implemented by urging the resource element mappers 51, 52 to apply well-known techniques such as differentiating the stagger arrangements (frequency multiplexing) of the two SRS, applying different sequences (code multiplexing) to the two SRS, or combining these operations, on the basis of the directions of the control unit 100.

In addition, the control unit 100 controls the resource element mappers 51, 52 to map the SRS on a band Ba, in order to assure the frequency correlation of the SRS received by the base station apparatus. Such control urges two SRS orthogonal in frequency or code to be mapped on the band Ba and transmitted to the base station apparatus.

In step 2d, the control unit 100 first generates two identical SRS, and controls the resource element mappers 51, 52 such that the SRS transmitted from the antenna 81 and the SRS transmitted from the antenna 82 are identical with each other in terms of frequency and code. Identifying the frequencies and codes of the two SRS can be implemented by urging the resource element mappers 51, 52 to apply well-known techniques such as identifying the stagger arrangements (frequency multiplexing) of the two SRS, applying the same sequence (code multiplexing) to the two SRS, or combining these operations, on the basis of the directions of the control unit 100.

In addition, the control unit 100 controls the resource element mappers 51, 52 to map the SRS on a wider band Bb (>Ba). Such control urges the two SRS identical in frequency or code to be mapped on the band Bb and transmitted to the base station apparatus.

In the mobile radio terminal having the above-described configuration, when the SRS on which the CSI measurement is based at the base station apparatus is transmitted from each of the antennas, the frequencies or codes at the two antennas are controlled to be orthogonal to each other or to be the same frequencies or the same codes, in accordance with the use of the CSI at the base station apparatus.

Therefore, since the frequencies or codes of the SRS are made orthogonal in the only case where the orthogonality is required in the SRS transmitted from a plurality of antennas, at the CSI measurement at the base station apparatus, limited combination of the frequencies or codes made orthogonal can be used efficiently and the transmission path characteristic can be evaluated effectively.

In the mobile radio terminal having the above-described configuration, the UE specific parameter transmitted from the base station apparatus directly indicates identity/orthogonality of the SRS and, in accordance with this, the identity/orthogonality of the SRS transmitted from the two antennas is changed. However, the change may be executed on the basis of indirect information according to the other parameter.

The purpose of transmitting the SRS is to measure the CSI to select the resource block, measure the CSI to set MIMO Pre-coding, obtain information to adjust the transmission timing, and the like. For this reason, the transmission of the SRS can also be implemented by the following operation.

The control unit 100 makes the SRS identical when the SRS are mapped on the wider band Bb, or makes the SRS orthogonal when the SRS are mapped on the narrower band Ba. The width of the band for mapping is discriminated on the basis of the UE specific parameter to define the SRS transmission.

The cycle of executing the allocation of the resource block and measurement of the transmission timing is generally longer than the cycle of setting the Pre-coding of the MIMO transmission. For this reason, when the SRS are cyclically transmitted, the control unit 100 makes the SRS identical if the cycle is long or makes the SRS orthogonal if the cycle is short. The length of the transmission cycle of the SRS is discriminated on the basis of the UE specific parameter to define the SRS transmission.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, in the above-described embodiment, the mobile radio terminal has two transmission systems, but the present invention can also be applied to a case where the mobile radio terminal has three or more transmission systems. In this case, the same advantage can be achieved.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus, comprising:
a first antenna configured to execute radio transmission with a counterpart station;
a second antenna configured to execute radio transmission with the counterpart station;
a signal generating unit configured to generate a known signal which is known to the counterpart station;
a use detecting unit configured to detect a use of an evaluation result of a transmission path characteristic executed by the counterpart station; and
a transmission control unit configured to make the known signal subjected to the radio transmission via the first antenna and the known signal subjected to the radio transmission via the second antenna orthogonal or identical with each other, in accordance with the use detected by the use detecting unit, and execute radio transmission.

2. The apparatus according to claim 1, wherein the use detecting unit detects the use of the evaluation result of the transmission path characteristic executed by the counterpart station, in accordance with a signal received from the counterpart station.

3. The apparatus according to claim 1, wherein the transmission control unit executes mutually different code multiplexing for the known signal subjected to the radio transmission via the first antenna and the known signal subjected to the radio transmission via the second antenna, to make the known signals orthogonal to each other.

4. The apparatus according to claim 1, wherein the transmission control unit executes mutually different stagger arrangement of the known signal subjected to the radio transmission via the first antenna and the known signal subjected to the radio transmission via the second antenna, on resource blocks, and transmit the known signals, to make the known signals orthogonal to each other.

5. The apparatus according to claim 1, wherein when the known signal subjected to the radio transmission via the first antenna and the known signal subjected to the radio transmission via the second antenna are made orthogonal to each other and transmitted, the transmission control unit executes radio transmission, in a narrower transmission bandwidth than that in a case where the known signals are made identical and transmitted.

6. A radio communication apparatus, comprising:
a first antenna configured to execute radio transmission with a counterpart station;
a second antenna configured to execute radio transmission with the counterpart station;
a signal generating unit configured to generate a known signal which is known to the counterpart station; and
a transmission control unit configured to make the known signal subjected to the radio transmission via the first antenna and the known signal subjected to the radio transmission via the second antenna orthogonal to each other, when the known signals are subjected to the radio transmission to the counterpart station in a first cycle, and to make the known signal subjected to the radio transmission via the first antenna and the known signal subjected to the radio transmission via the second antenna identical with, each other, when the known signals are subjected to the radio transmission to the counterpart station in a second cycle longer than the first cycle.

7. The apparatus according to claim 6, wherein the transmission control unit executes mutually different code multiplexing for the known signal subjected to the radio transmission via the first antenna and the known signal subjected to the radio transmission via the second antenna, to make the known signals orthogonal to each other.

8. The apparatus according to claim 6, wherein the transmission control unit executes mutually different stagger arrangement of the known signal subjected to the radio transmission via the first antenna and the known signal subjected to the radio transmission via the second antenna, on resource blocks, and transmit the known signals? to make the known signals orthogonal to each other.

9. A radio communication apparatus, comprising:
a first antenna configured to execute radio transmission with a counterpart station;
a second antenna configured to execute radio transmission with the counterpart station;
a signal generating unit configured to generate a known signal which is known to the counterpart station; and
a transmission control unit configured to make the known signal subjected to the radio transmission via the first antenna and the known signal subjected to the radio transmission via the second antenna orthogonal to each other, when the known signals are allocated to a first bandwidth and subjected to the radio transmission to the counterpart station, and to make the known signal subjected to the radio transmission via the first antenna and the known signal subjected to the radio transmission via the second, antenna identical with each other, when the known signals are allocated to a second bandwidth longer than the first bandwidth and subjected to the radio transmission to the counterpart station.

10. The apparatus according to claim 9, wherein the transmission control unit executes mutually different code multiplexing for the known signal subjected to the radio transmission via the first antenna and the known signal subjected to the radio transmission via the second antenna, to make the known signals orthogonal to each other.

11. The apparatus according to claim 9, wherein the transmission control unit executes mutually different stagger arrangement of the known signal subjected to the radio transmission via the first antenna and the known signal subjected to the radio transmission via the second antenna, on resource blocks, and, transmit the known signals, to make the known signals orthogonal to each other.

12. A radio communication method, comprising:
generating a known signal which is known to a counterpart station;
detecting a use of an evaluation result of a transmission path characteristic executed by the counterpart station; and
making the known signal subjected to a radio transmission via a first antenna and the known signal subjected to the radio transmission via a second antenna orthogonal or identical with each other, in accordance with the use detected by the detecting, and executing radio transmission.

13. A radio communication method, comprising:
generating a known signal which is known to a counterpart station; and
making the known signal subjected to a radio transmission via a first antenna and the known signal subjected to the radio transmission via a second antenna orthogonal to each other, when the known signals subjected to the radio transmission to the counterpart station in a first cycle, and making the known signal subjected to the radio transmission via the first antenna and the known signal subjected to the radio transmission via the second antenna identical with each other, when the known signals are subjected to the radio transmission to the counterpart station in a second cycle longer than the first cycle.

14. A radio communication method, comprising:
generating a known signal which is known to a counterpart station; and
making the known signal subjected to a radio transmission via a first antenna and the known signal subjected to the radio transmission via a second antenna orthogonal to each other, when the known signals are allocated to a first bandwidth and subjected to the radio transmission to the counterpart station, and making the known signal subjected to the radio transmission via the first antenna and the known signal subjected to the radio transmission via the second antenna identical with each other, when the known signals are allocated to a second bandwidth longer than the first bandwidth and subjected to the radio transmission to the counterpart station.

* * * * *